(12) United States Patent
Chen

(10) Patent No.: US 9,145,991 B2
(45) Date of Patent: *Sep. 29, 2015

(54) THREAD STRUCTURE OF AN AERATOR FOR WATER FAUCET OUTLET

(71) Applicant: CHUAN WEI METAL CO., LTD., Changhua County (TW)

(72) Inventor: Chi-Chuan Chen, Changhua County (TW)

(73) Assignee: CHUAN WEI METAL CO., LTD., Changhua County (TW)

( * ) Notice: Subject to any disclaimer, the term of this patent is extended or adjusted under 35 U.S.C. 154(b) by 274 days.

This patent is subject to a terminal disclaimer.

(21) Appl. No.: 13/873,421

(22) Filed: Apr. 30, 2013

(65) Prior Publication Data

US 2014/0319832 A1  Oct. 30, 2014

(51) Int. Cl.
*F16L 15/00* (2006.01)
*F16L 15/06* (2006.01)
*E03C 1/084* (2006.01)

(52) U.S. Cl.
CPC *F16L 15/06* (2013.01); *E03C 1/084* (2013.01)

(58) Field of Classification Search
USPC .................... 285/8, 333–334, 355, 390, 12; 239/428.5

See application file for complete search history.

(56) References Cited

U.S. PATENT DOCUMENTS

| | | | | |
|---|---|---|---|---|
| 2,971,701 | A * | 2/1961 | Shames et al. | 239/587.4 |
| 3,450,350 | A * | 6/1969 | Gullaksen | 239/428.5 |
| 4,822,076 | A * | 4/1989 | Padilla | 285/8 |
| 7,252,248 | B2 * | 8/2007 | Cutler | 239/428.5 |
| 8,485,564 | B2 * | 7/2013 | Chen | 285/390 |
| 2003/0042337 | A1 * | 3/2003 | Liang et al. | 239/575 |
| 2003/0197072 | A1 * | 10/2003 | Flieger | 239/428.5 |
| 2005/0087717 | A1 * | 4/2005 | Burke | 251/263 |
| 2007/0108314 | A1 * | 5/2007 | Cutler | 239/428.5 |
| 2007/0194154 | A1 * | 8/2007 | Katzer | 239/589 |

* cited by examiner

*Primary Examiner* — Aaron Dunwoody
*Assistant Examiner* — Fannie Kee

(57) ABSTRACT

A thread structure of an aerator for a water faucet, wherein based on the pitch, the major diameter and the pitch diameter of the metric and imperial threads of water faucets and the variation tolerance, universal measurements of the corresponding pitch, major diameter and pitch diameter and the variation tolerance for the aerator are calculated.

3 Claims, 5 Drawing Sheets

External (Millimeter)

| Nominal Size | Pitch | Angles | Class | Major Diameter | | Pitch Diameter | | | UNR Minor Dia | | Effective Length Max |
|---|---|---|---|---|---|---|---|---|---|---|---|
| | | | | Max | Min | Max | Min | Tol | Max(Ref.) | Min | |
| 15/16"-27UNS | 0.941 | 60 | 2A | 23.546 | 23.444 | 23.165 | 22.962 | | | | |
| CW-M24 | 0.960 | 60 | | 23.760 | 23.619 | 23.224 | 23.084 | | | | |
| M24*1.0 | 1.000 | 60 | 6g | 23.974 | 23.794 | 23.324 | 23.206 | 0.118 | 22.891 | 22.590 | |

Internal (Millimeter)

| Nominal Size | Class | Minor Diameter | | Pitch Diameter | | | Major Diameter | | Effective Length Min |
|---|---|---|---|---|---|---|---|---|---|
| | | Min | Max | Min | Max | Tol | Min | Max | |
| 15/16"-27UNS | 2B | 22.860 | 22.962 | 23.188 | 23.373 | | 23.813 | | |
| CW-M24 | | 22.889 | 23.057 | 23.269 | 23.442 | | | | |
| M24*1.0 | 6H | 22.917 | 23.153 | 23.350 | 23.510 | 0.160 | 24.000 | 24.304 | 4.5 |

FIG. 1

THREAD STRUCTURE OF AN AERATOR FOR WATER FAUCET OUTLET

BACKGROUND OF THE INVENTION

1. Field of the Invention

The present invention relates to a thread structure of an aerator for a water faucet, with the design of the pitch, the major diameter and the pitch diameter of an internal thread of the aerator and the variation tolerance, an effective engagement relation can be established when subject to the different metric and imperial specifications of the external thread of a water faucet. As such, the present invention provides a universal use and application of the thread structure.

2. Description of Related Art

For avoiding an issue of water splashing while controlling the flow amount of discharged water from a faucet, an aerator is often installed in the water outlet part, thereby obtaining smoother water flow and preventing water splashing, so when a user allows the water to be discharged in a massive amount, the surrounding is prevented from being splashed with water and being wet.

What shall be addressed is that after the mentioned aerator has been used for a period of time, problems such as blocking or permeating may occur, so the aerator is seen as a consumable product which has to be replaced every now and then. For facilitating the detachment and engagement of the aerator, the manufacturer often has the bottom end of the water faucet designed with an external thread, and the aerator is designed with an internal thread. With the matching internal and external threads, the aerator and the water faucet can be smoothly and effectively engaged and locked.

However, in the faucet production, the measurement system and custom in different market regions may adopt different specifications, such as metric and imperial; i.e., for the matching of the threads of the water faucet and the aerator, two different specifications of metric and imperial are therefore required. As a result, a metric aerator cannot be used with an imperial faucet, and an imperial aerator cannot be used with a metric faucet, and a forced engagement of different specifications may cause inadequate engagement and permeation. Thus for the sales of aerator, the aerator is clearly marked with the specification of faucet suitable to be applied, thereby preventing the consumer from buying an unsuitable aerator.

As a matter of fact, most consumers are not aware that the faucets they have been using are in either metric or imperial measurement, or otherwise do not have the knowledge of identifying the specification of the faucet they are using, so when buying an aerator, they would not pay attention to which is the suitable specification, and often feel frustrated when realizing that the specification is wrong and the purchased product can be not used. In addition, there is another problem related to the lack of specification knowledge, when the consumers take the product back to the shop to exchange for one with the right specification, a free replacement may not be obtained because the package material of the product is damaged or not complete, or the product has some scratches, so extra money has to be paid for getting the right product. As such, not only has money been unnecessarily spent, extra time and other inconvenience may also result.

SUMMARY OF THE INVENTION

In view of the problems and disadvantages related to the thread engagement of existing water faucets and aerators, the inventor of the present invention, having been involved in the relevant industries for many years and having advanced skills and knowledge to make an integral design for the metric and imperial threads of the faucets and aerators which are commonly seen in the marketplace, therefore has provided an improved structure, in which the specification of the external and internal thread of an aerator is designed to be capable of being engaged and locked with a metric and an imperial internal thread of water faucets having the same specification, and also capable of being engaged and locked with a metric and an imperial external thread of water faucets having the same specification, thereby achieving the practicability and convenience of being universally applicable to both of the metric/imperial internal/external threads of water faucets having the same specification.

Another object of the present invention is to provide a designed assembly which allows a consumer to not have to consider whether the thread of the water faucet is in metric or imperial measurement when buying an aerator for replacement by himself/herself, as long as the aerator matches the specification, the replacement can be easily done without concern of buying the wrong product.

One another object of the present invention is to provide a designed assembly which allows the store inventory of the product with a single specification, so when having the orders requiring the aerators with the same specification, the dispatch can be easily processed with the products having the same specification, without the needs of concerning each faucet being in metric or imperial measurement, thereby simplifying inventory management and production items, and achieving the industrial utility and economic benefit.

For achieving the mentioned objects, the structural design of the present invention is based on the pitch, the major diameter and the pitch diameter of the metric and imperial thread of the water faucet and the variation tolerance to calculate the universal measurement of corresponding pitch, major diameter and pitch diameter and the variation tolerance, such that the aerator can be engaged and locked in a metric water faucet and also can be engaged and locked in an imperial water faucet, thereby achieving a universal fit.

BRIEF DESCRIPTION OF THE DRAWINGS

FIG. 1 is a specification table showing the metric and imperial aerators and the aerator provided by the present invention;

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 2:
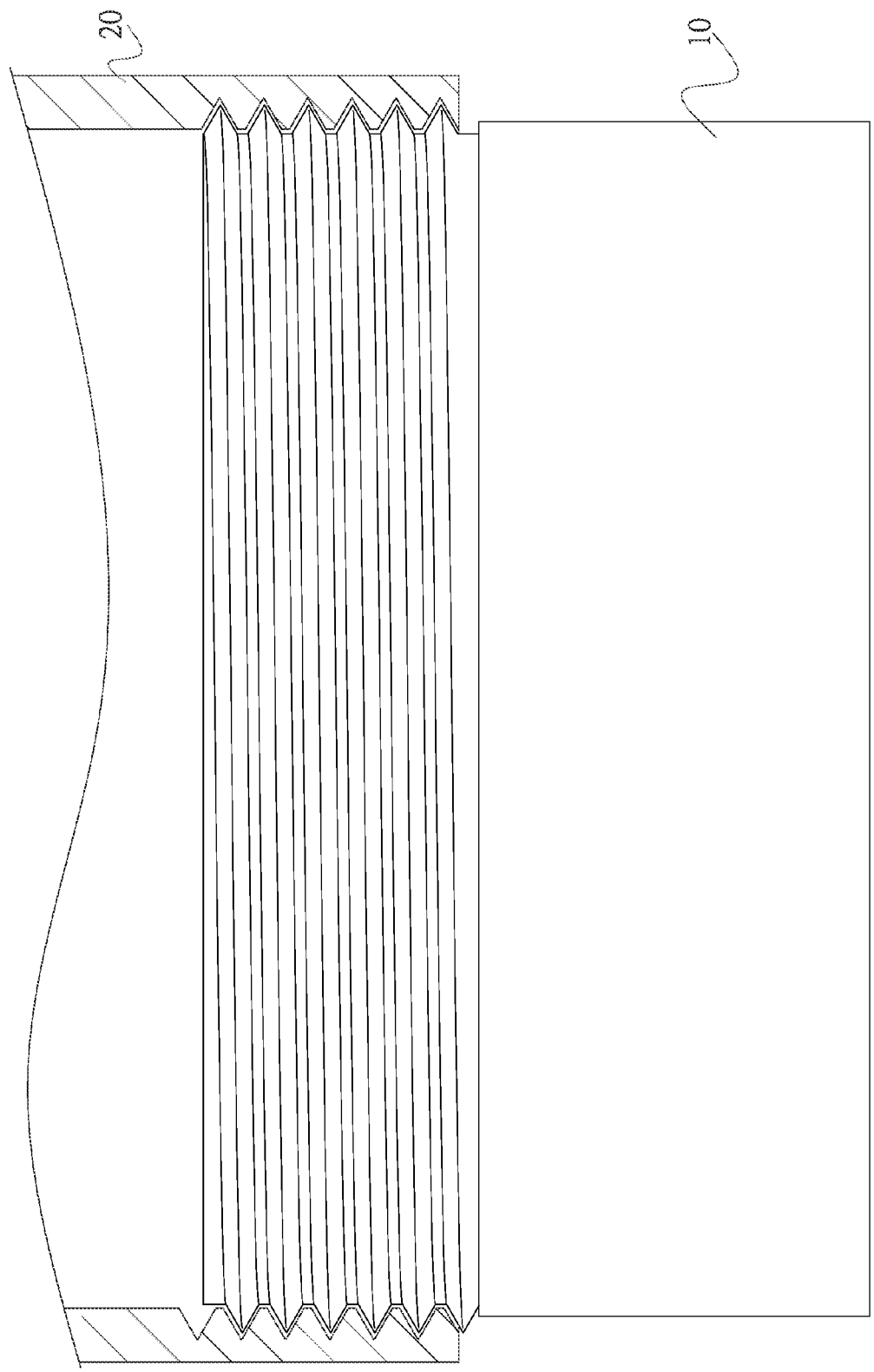
FIG. 2 is a schematic view showing the engagement relation of the aerator of the present invention being engaged with the metric internal thread of a water faucet.
Figure 3:
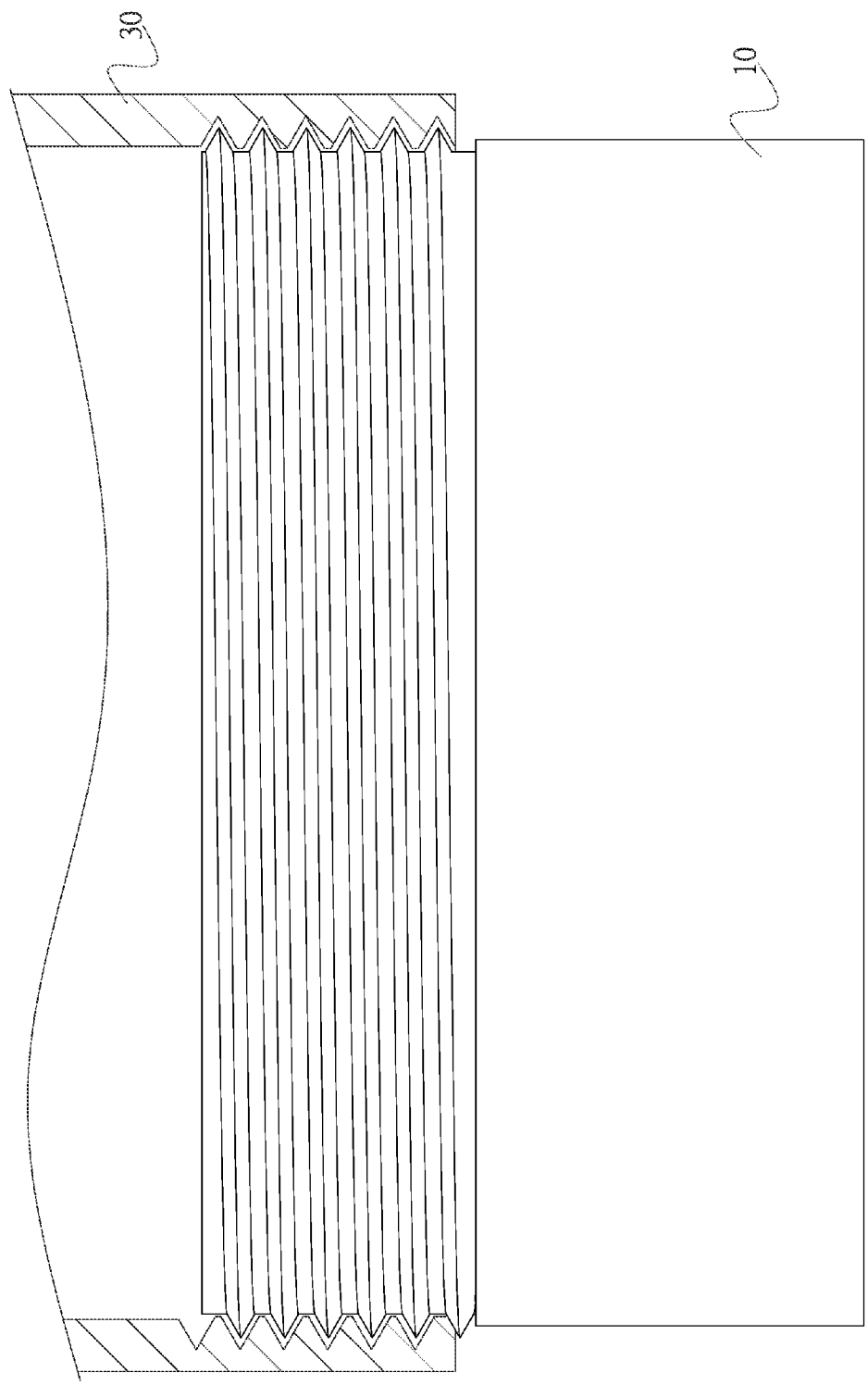
FIG. 3 is a schematic view showing the engagement relation of the aerator of the present invention being engaged with the imperial internal thread of a water faucet.
Figure 4:
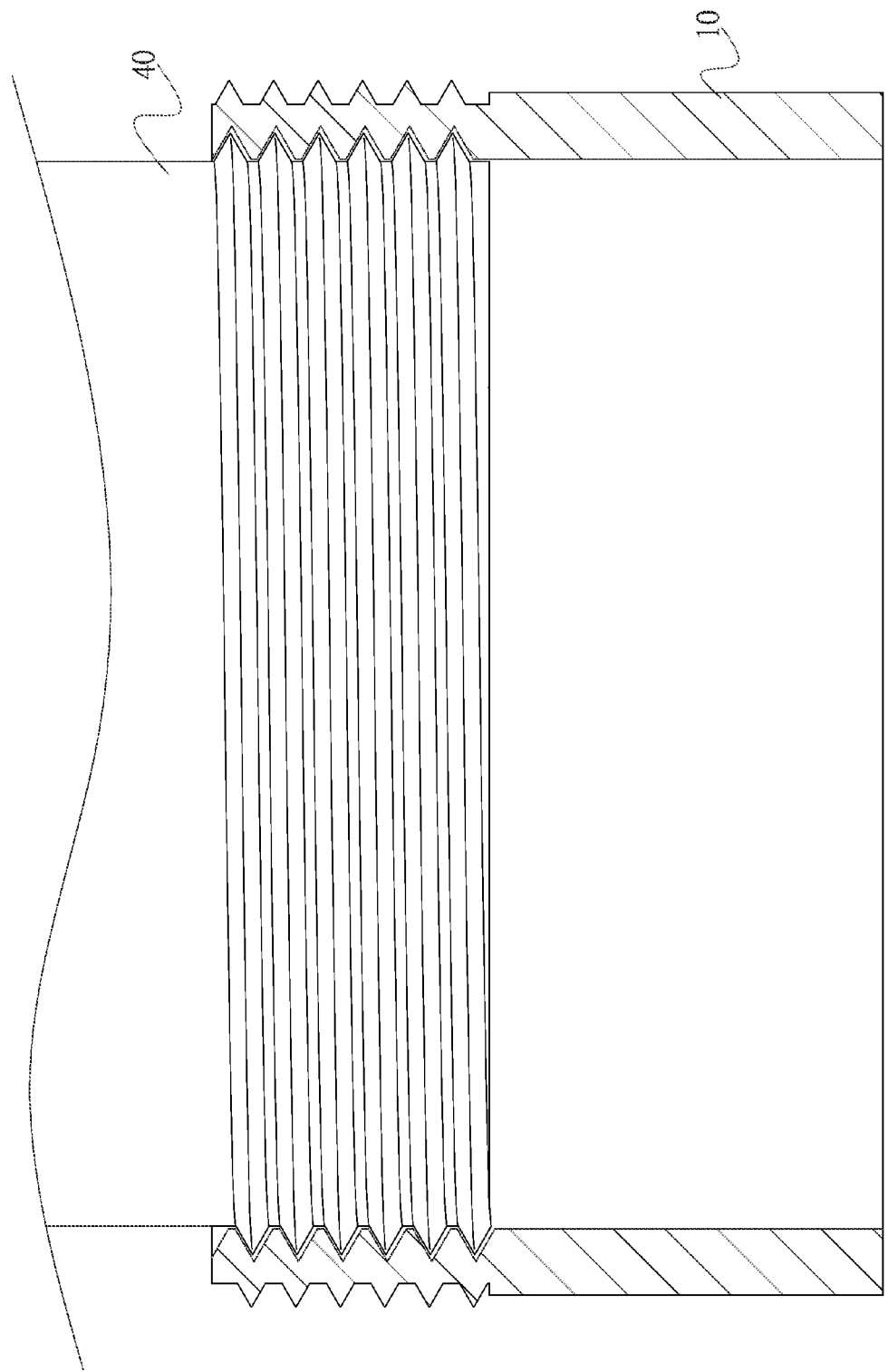
FIG. 4 is a schematic view showing the engagement relation of the aerator of the present invention being engaged with the metric external thread of a water faucet.
Figure 5:
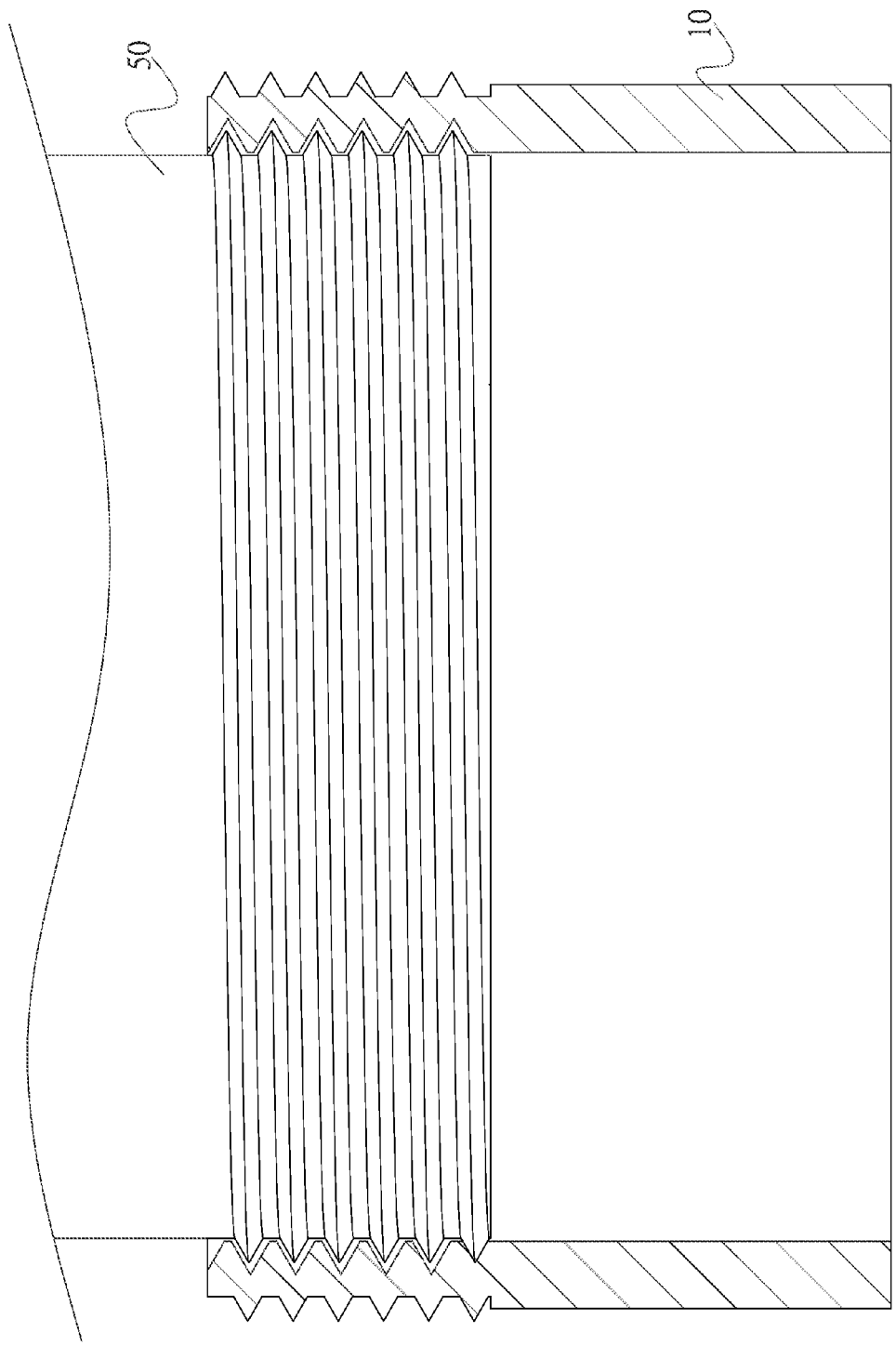
FIG. 5 is a schematic view showing the engagement relation of the aerator of the present invention being engaged with the imperial external thread of a water faucet.

Please refer to FIG. 1 to FIG. 5, wherein FIG. 1 is a specification table showing the metric and imperial aerators and the aerator provided by the present invention; FIG. 2 is a schematic view showing the engagement relation of the aerator of the present invention being engaged with the metric internal thread of a water faucet; FIG. 3 is a schematic view showing the engagement relation of the aerator of the present invention being engaged with the imperial internal thread of a water faucet; FIG. 4 is a schematic view showing the engagement relation of the aerator of the present invention being engaged with the metric external thread of a water faucet; and FIG. 5 is a schematic view showing the engagement relation of the aerator of the present invention being engaged with the imperial external thread of a water faucet. According to the present invention, the aerator of the present invention being used in a M24 (15/16") water faucet is adopted as one preferred embodiment for illustration. As shown in the figures, for a metric aerator used in a metric (M24) internal thread of a water faucet, the pitch thereof is 1.000 mm, the angle is 60 DEG, the maximum major diameter is 23.974 mm, the minimum major diameter is 23.794 mm, the maximum pitch diameter is 23.324 mm, and the minimum pitch diameter is 23.206 mm; for an imperial aerator used in an imperial (15/16") internal thread of a water faucet, the pitch thereof is 0.941 mm, the angle is 60 DEG, the maximum major diameter is 23.546 mm, the minimum major diameter is 23.444 mm, the maximum pitch diameter is 23.165 mm, and the minimum pitch diameter is 22.962 mm, wherein on the basis of the average values of the mentioned measurements of the pitch, major diameter and pitch diameter, the universal specification (CW-M24) of the aerator provided by the present invention is obtained, in which the pitch is 0.960 mm, the angle is 60 DEG, the maximum major diameter is 23.760 mm, the minimum major diameter is 23.619 mm, the maximum pitch diameter is 23.244 mm, and the minimum pitch diameter is 23.084 mm. With the provided values, it is known that the pitch, major diameter and pitch diameter of the universal aerator 10 of the present invention are all within the specification ranges of the metric and imperial external thread aerators. In addition, the angle specifications of the conventional metric and imperial aerators and the aerator 10 provided by the present invention are all designed to be 60 DEG, thus no matter whether the universal aerator 10 of the present invention is engaged in a water faucet having the metric internal thread 20, or the universal aerator 10 of the present invention is engaged in a water faucet having the imperial internal thread 30, the engagement and locking can be smoothly done, and an engagement relation having certain thread numbers is formed, thereby achieving the practicability of being suitably and universally used in the water faucet having the metric internal thread 20 and the water faucet having the imperial internal thread 30.

In addition, for a metric aerator used in a metric (M24) external thread of a water faucet, the pitch thereof is 1.000 mm, the angle is 60 DEG, the maximum minor diameter is 23.153 mm, the minimum minor diameter is 22.917 mm, the maximum pitch diameter is 23.510 mm, and the minimum pitch diameter is 23.350 mm; and for an imperial aerator used in an imperial (15/16") external thread of a water faucet, the pitch thereof is 0.941 mm, the angle is 60 DEG, the maximum minor diameter is 22.962 mm, the minimum minor diameter is 22.860 mm, the maximum pitch diameter is 23.373 mm, and the minimum pitch diameter is 23.188 mm, wherein on the basis of the average values of the mentioned measurements of the pitch, major diameter and pitch diameter, the universal specification (CW-M24) of the aerator provided by the present invention is obtained, in which the pitch is 0.960 mm, the angle is 60 DEG, the maximum minor diameter is 23.057 mm, the minimum minor diameter is 22.889 mm, the maximum pitch diameter is 23.442 mm, and the minimum pitch diameter is 23.188 mm. With the provided values, it is known that the pitch, minor diameter and pitch diameter of the universal aerator 10 of the present invention are all within the specification ranges of the metric and imperial external thread aerators. In addition, the angle specifications of the conventional metric and imperial aerator and the aerator 10 provided by the present invention are all designed to be 60 DEG, thus no matter whether the universal aerator 10 of the present invention is engaged in a water faucet having the metric external thread 40, or the universal aerator 10 of the present invention is engaged in a water faucet having the imperial external thread 50, the engagement and locking can be smoothly done, and an engagement relation having certain thread numbers is formed, thereby achieving the practicability of being suitably and universally used in the water faucet having the metric external thread 40 and the water faucet having the imperial external thread 50.

Based on the above disclosure, for providing an aerator which can be suitably used in both of the metric and imperial water faucets, the present invention designs the pitch, the angle, the major (minor) diameter and the pitch diameter of an aerator for being applicable to the existing specifications of metric or imperial aerators. As such, when a consumer wants to buy an aerator for the purpose of replacement, he/she only has to consider the specification of the water faucet for choosing a suitable aerator, and is not concerned with the measurement of the water faucet being in metric or imperial, thereby providing convenience in buying and prevention from buying the wrong product. In addition, a manufacturer does not need to produce two different specifications, which are metric and imperial, thereby simplifying the production and inventory management, and further shortening the order delivery date. Therefore, the present invention is valuable in actual needs and provides a better utilization and economical benefit.

According to the aforesaid disclosure, the thread structure of the aerator for a water faucet has a designed pitch, major (minor) diameter and pitch diameter, so it can be engaged in the water faucets having the same specification but respectively in the metric and imperial measurements, thereby providing a function of universal replacement, so the convenience is provided to a consumer when buying, and the production and inventory management for a manufacturer are also simplified. The present invention overcomes the problem and disadvantage that conventional aerators have to be produced to match both of the metric and imperial measurements for a water faucet having the same specification. As a whole, the present invention provides a novel design which has not been seen, used, or launched in any marketplace.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A thread structure of an aerator for a water faucet, wherein an external thread of the aerator enables the aerator to be engaged with either a metric or an imperial dimensioned internal thread in the water faucet, wherein the external thread of the aerator comprises:
a pitch of 0.960 mm, an angle of 60 DEG, a maximum major diameter of 23.760 mm, a minimum major diameter of 23.619 mm, a maximum pitch diameter of 23.244 mm, and a minimum pitch diameter of 23.084 mm.

2. A thread structure of an aerator for a water faucet, wherein the internal thread of the aerator enables the aerator to be engaged with either a metric or an imperial dimensioned external thread on the water faucet,
wherein the internal thread of the aerator comprises:
a pitch of 0.960 mm, an angle of 60 DEG, a maximum minor diameter of 23.057 mm, a minimum minor diameter of 22.889 mm, a maximum pitch diameter of 23.442 mm, and a minimum pitch diameter of 23.188 mm.

3. A thread structure of an aerator for a water faucet, wherein the internal and external thread structure of the aerator enables the aerator to be engaged with the corresponding metric or imperial dimensioned internal or external thread of the water faucet,
wherein the internal thread of the aerator comprises:
a pitch of 0.960 mm, an angle of 60 DEG, a maximum minor diameter of 23.057 mm, a minimum minor diameter of 22.889 mm, a maximum pitch diameter of 23.442 mm, and a minimum pitch diameter of 23.188 mm; and
wherein the external thread of the aerator comprises:
a pitch of 0.960 mm, an angle of 60 DEG, a maximum major diameter of 23.760 mm, a minimum major diameter of 23.619 mm, a maximum pitch diameter of 23.244 mm, and a minimum pitch diameter of 23.084 mm.

* * * * *